(12) United States Patent
Pishehvari et al.

(10) Patent No.: US 12,454,260 B2
(45) Date of Patent: Oct. 28, 2025

(54) METHOD FOR VEHICLE DRIVING ASSISTANCE WITHIN DELIMITED AREA

(71) Applicant: Aptiv Technologies AG, Schaffhausen (CH)

(72) Inventors: Ahmad Pishehvari, Wuppertal (DE); Dennis Vollbracht, Hilden (DE)

(73) Assignee: Aptiv Technologies AG, Schaffhausen (CH)

( * ) Notice: Subject to any disclaimer, the term of this patent is extended or adjusted under 35 U.S.C. 154(b) by 129 days.

(21) Appl. No.: 18/160,553

(22) Filed: Jan. 27, 2023

(65) Prior Publication Data
US 2023/0242099 A1 Aug. 3, 2023

(30) Foreign Application Priority Data
Jan. 28, 2022 (EP) ..................................... 22153966

(51) Int. Cl.
*B60Q 1/48* (2006.01)
*B60W 30/06* (2006.01)
(Continued)

(52) U.S. Cl.
CPC ............. *B60W 30/06* (2013.01); *G07C 5/008* (2013.01)

(58) Field of Classification Search
CPC ...... B60W 30/06; G07C 5/008; G06F 18/251; G08G 1/0112; G08G 1/0141;
(Continued)

(56) References Cited

U.S. PATENT DOCUMENTS 9,547,989 B2 * 1/2017 Fairfield .......... G08G 1/096725
9,947,224 B2 * 4/2018 Fairfield .......... G08G 1/096775
(Continued)

FOREIGN PATENT DOCUMENTS

CN 107024927 8/2017
KR 20190121275 10/2019

OTHER PUBLICATIONS

"Extended European Search Report", EP Application No. 22153966.1, Jun. 9, 2022, 8 pages.
(Continued)

*Primary Examiner* — Toan N Pham
(74) *Attorney, Agent, or Firm* — Harness, Dickey & Pierce, P.L.C.

(57) ABSTRACT

The present disclosure relates to the field of vehicle driving assistance and/or autonomous driving within a delimited area, such as an indoor space. The disclosure includes a computer-implemented method for vehicle driving assistance within a delimited area, which includes the followings steps performed by a central data processing system: receiving from a plurality of vehicles ($V_i$, i=1, 2, 3, . . . ) located within the delimited area, through a wireless local area network covering said delimited area, sensing data from onboard sensors of the vehicles (Vi), whereby the sensing data from each vehicle (Vi) is related to an environment around said vehicle (Vi), centrally processing and fusing the sensing data from the plurality of vehicles (Vi); and transmitting to at least one target vehicle (Vi), through the wireless local area network, an information for vehicle driving assistance based on a result of the step of centrally processing and fusing.

15 Claims, 3 Drawing Sheets

(51) Int. Cl.
*G07C 5/00* (2006.01)
*G08G 1/14* (2006.01)

(58) Field of Classification Search
CPC ........... G08G 1/096741; G08G 1/0133; G08G 1/096725; G08G 1/096775; H04W 4/40; H04W 4/021; H04W 4/33; H04W 4/38; H04W 4/46; H04L 67/12; G06V 20/56
See application file for complete search history.

(56) References Cited

U.S. PATENT DOCUMENTS

| | | | |
|---|---|---|---|
| 10,637,142 B1 | 4/2020 | Tran et al. | |
| 10,971,017 B2* | 4/2021 | Tulpule | H04W 4/44 |
| 10,999,719 B1* | 5/2021 | Kaplan | G06F 16/29 |
| 11,507,084 B2* | 11/2022 | Sharma | G06V 20/582 |
| 11,661,077 B2* | 5/2023 | Qi | H04W 4/44 |
| | | | 701/23 |
| 11,698,272 B2* | 7/2023 | Kroepfl | G01S 17/89 |
| | | | 701/409 |
| 12,007,728 B1* | 6/2024 | Mohta | G06F 18/25 |
| 2019/0096238 A1 | 3/2019 | Ran et al. | |
| 2019/0347931 A1 | 11/2019 | Ding et al. | |
| 2020/0394918 A1 | 12/2020 | Chen | |
| 2021/0063200 A1 | 3/2021 | Kroepfl et al. | |
| 2021/0406558 A1 | 12/2021 | Liu et al. | |
| 2023/0356745 A1* | 11/2023 | Rossi, Jr. | G08G 1/165 |

OTHER PUBLICATIONS

"Localization in 5G", Retrieved at: https://www.iis.fraunhofer.de/de/profil/jb/2019/lokalisieren-in-5g.html—on Nov. 29, 2022, 6 pages.
"Positioning and positioning with mobile radio", Retrieved at: https://www.elektronik-kompendium.de/sites/kom/1201061.htm—on Nov. 29, 2022, 9 pages.

* cited by examiner

METHOD FOR VEHICLE DRIVING ASSISTANCE WITHIN DELIMITED AREA

INCORPORATION BY REFERENCE

This application claims priority to European Patent Application Number EP22153966.1, filed Jan. 28, 2022, the disclosure of which is incorporated by reference in its entirety.

BACKGROUND

An autonomous or automated vehicle must be able to perform different tasks including self-localization, environment modelling, mapping and tracking of external objects such as pedestrians, other vehicles, and bikes, whatever the circumstances.

Self-localization may be the most important task of an autonomous vehicle. The more accurate the self-localization of the autonomous vehicle, the more accurate the localization and tracking of external objects. Self-localization of the autonomous vehicle can be performed based on data collected by different onboard sensing systems such as cameras, LiDARs, radars, etc.

Furthermore, the autonomous vehicle has to generate an environment model to recognize the static objects, for example a wall, in its surrounding environment, avoid collisions with the static objects, and plan an optimal path from a point A to a point B.

A known method of self-localization uses a satellite navigation system such as GNSS (Global Navigation Satellite System). It allows the vehicle provided with a receiver for receiving the GNSS signals to determine its location (longitude, latitude, and altitude/elevation) to high precision (within a few centimeters to meters) using time signals transmitted along a line of sight by radio from satellites. However, within an indoor environment, e.g., in a tunnel or a parking garage, the signals from the satellite navigation system are generally not available and the self-localization must be performed in a different way.

Different methods are known for self-localization of an autonomous vehicle in an indoor environment.

A first known method consists in tracking the position and orientation of the vehicle using mechanical motion sensors, such as accelerators and gyroscopes, and a motion model.

In a second known method, successive observations are collected by one or more onboard sensors, such as a LIDAR or a camera, registered, and the motion of the vehicle is derived from these successive observations.

The document KR20190121275 A discloses an indoor positioning method for positioning a vehicle within an indoor space, based on a machine learning and/or artificial intelligence algorithm. The vehicle acquires image information of the indoor space with a sensing system, and the acquired information is matched with a pre-generated indoor map to localize the vehicle in the indoor space based on the matching result.

A disadvantage of the first and second methods is that they perform a relative positioning, which requires to know an initial position and orientation of the vehicle. The method of KR20190121275 A is limited to the positioning of one vehicle in the indoor space based on a pre-generated indoor map.

The known methods are limited to the self-localization of one vehicle in an indoor environment. Therefore, there is a need for improving the vehicle automated driving and/or the vehicle driving assistance within an indoor environment that other participants, like other vehicles and/or pedestrians, can enter.

SUMMARY

The present disclosure relates to the field of vehicle driving assistance and/or autonomous driving within a delimited area, such as an indoor space.

The present disclosure includes a computer-implemented method for vehicle driving assistance within a delimited area, including the followings steps performed by a central data processing system:

receiving from a plurality of vehicles located within the delimited area, through a wireless local area network, sensing data from onboard sensors of the vehicles, whereby the sensing data from each vehicle is related to an environment around said vehicle;

centrally processing and fusing the sensing data from the plurality of vehicles;

transmitting to at least one target vehicle of the plurality of vehicles, through the wireless local area network, an information for vehicle driving assistance based on a result of the step of centrally processing and fusing.

The present method originates from a need for improving vehicle autonomous driving and/or vehicle driving assistance within an indoor environment. However, the present method applies more generally to a delimited area that may include a tunnel, a car park, a warehouse, a bridge, or any other type of zone requiring an improved vehicle driving assistance, for example for security reason. The present method allows to obtain a centralized perception of the delimited area by sharing the sensing systems or sensors of all vehicles located in the delimited area. It is as if the central data processing system was equipped with the sensors of all vehicles. Furthermore, the processing of the sensing data collected by the sensors is carried out by the central data processing system, which allows to have basic and low-cost sensors without processing means in the vehicles. As a result, the implementation is simple and low-cost.

In an embodiment, the step of centrally processing and fusing may include generating a fused map of the delimited area based on the sensing data received from the plurality of vehicles, and the step of transmitting an information for vehicle driving assistance includes transmitting the generated map.

The fused map may aggregate the environmental information perceived by the sensing systems of all the vehicles and may be shared with all vehicles, in real time. In this way, each vehicle can map the environment within the delimited area as perceived by the sensors of all vehicles.

Other features of the present disclosure are defined in the appended claims.

BRIEF DESCRIPTION OF THE DRAWINGS

Other features, purposes, and aspects of the disclosure will become more explicit by means of reading the detailed statement of the non-restrictive example embodiments made with reference to the accompanying drawings.

DETAILED DESCRIPTION

The present disclosure relates to a methods and systems for vehicle driving assistance within a delimited area 100, including those described in the claims. Embodiments are given in the claims, the description, and the drawings.

Figure 1:
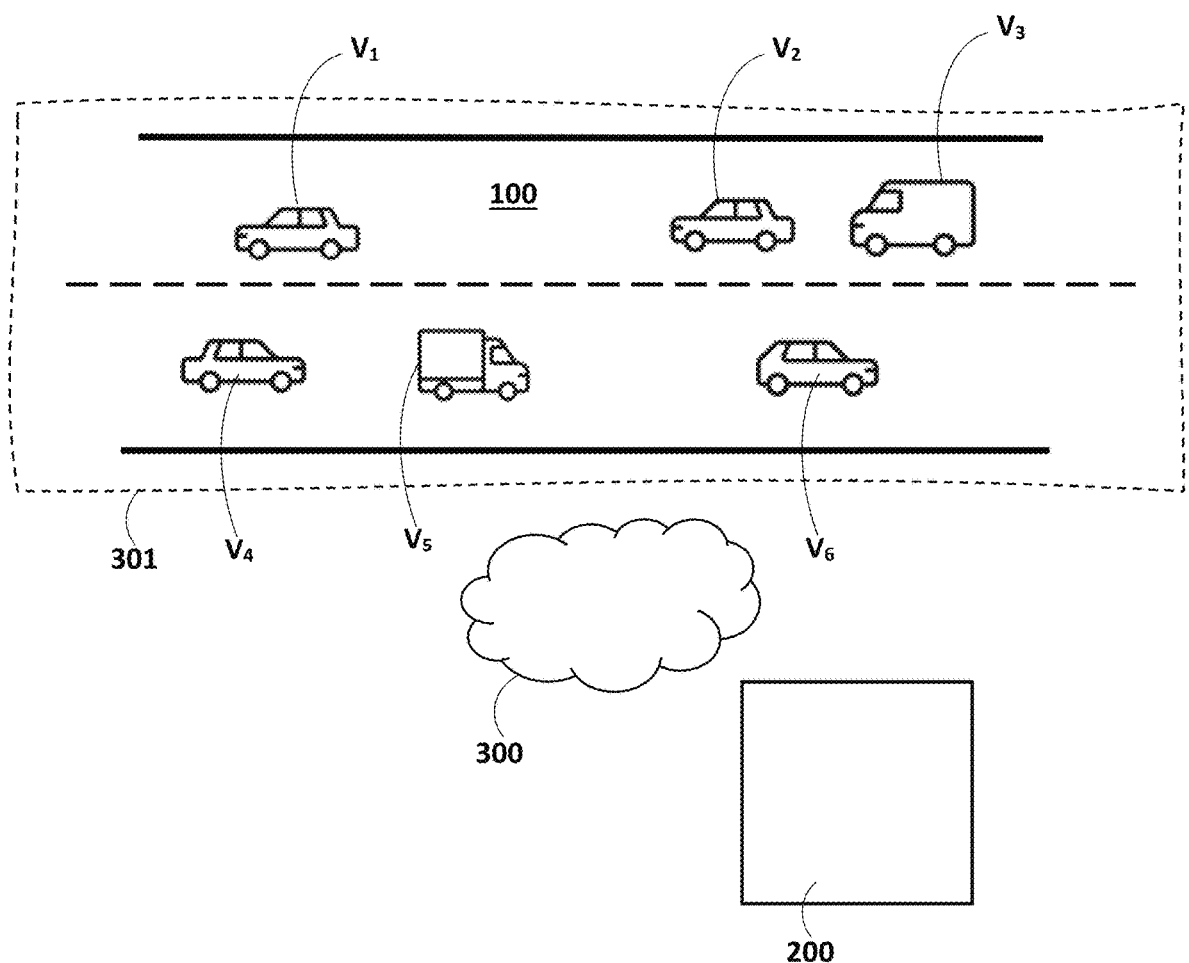
FIG. 1 illustrates a distributed system for vehicle driving assistance in an delimited area, according to various embodiment.

For example, the delimited area 100 may include an indoor space such as a road tunnel as illustrated in FIG. 1, a car park, or a warehouse where automated vehicles drive to perform logistics tasks. The delimited area may include any other zone requiring improved vehicle driving assistance, in particular for security reason. For example, the delimited area may include a road bridge. These examples are only illustrative and non-limitative.

A plurality of vehicles, referenced as $V_i$ with i=1, 2, 3, . . . , may enter and move within the delimited area 100. Other participants, such as pedestrians, may also enter and move within the delimited area 100.

The delimited area 100 is equipped with a central data processing system 200 and is covered by a wireless local area network 300, to which vehicles $V_i$ can connect.

The delimited area 100 may be termed as a sensing area, as it is an area in which vehicles send, or upload, sensing data captured by vehicle onboard sensors to the central data processing system 200 through the wireless local area network 300, as will be described later in more details.

In an embodiment, the wireless local area network 300 may a 5G-based network using the 5G technology. The 5G technology offers an extremely low latency rate that is the delay between the sending and receiving information. Alternatively, the wireless local area network 300 could be based on any other technology for wireless communication offering a low latency rate, for example 6G and any future generation communication system (e.g., a next generation communication system). The local area network 300 has a network identifier, or network ID, that may be broadcast by one or more base stations within an area covering the delimited area 100. The covering area 301 of the base station(s) may extend beyond the delimited area 100 to allow vehicles that are outside the delimited area 100 and move towards an access to the delimited area 100 to connect to the wireless local area network 300 before entering the delimited area 100. The wireless local area network 300 could be a part of a mobile telecommunication network, for example to one or more cells of the mobile telecommunication network.

The vehicles $V_i$, with i=1, 2, 3, . . . , may be automated vehicles or vehicles comprising one or more ADAS (Advanced Driving Assistance System) systems. Each vehicle $V_i$ has one or more onboard sensors or sensing systems, such as radar(s), LiDAR(s), and/or camera(s), for collecting sensing data related to its own vehicle environment. Furthermore, each vehicle $V_i$ comprises a radio communication module for connecting to the the wireless local area network 300 and communicating through it. The radio communication module may include a radio transmitter and a radio receiver. It can comprise hardware means and/or software means. The radio communication module allows the vehicle $V_i$ to connect to the wireless local area network 300, transmit the sensing data collected by the sensors of the vehicle $V_i$ to the central data processing system 200 and receive from the central data processing system 200 an information for vehicle driving assistance. Each vehicle may also include a registration module for registering with the central data processing system 200 upon detection and/or connection to the wireless local area network 300.

Figure 2A:
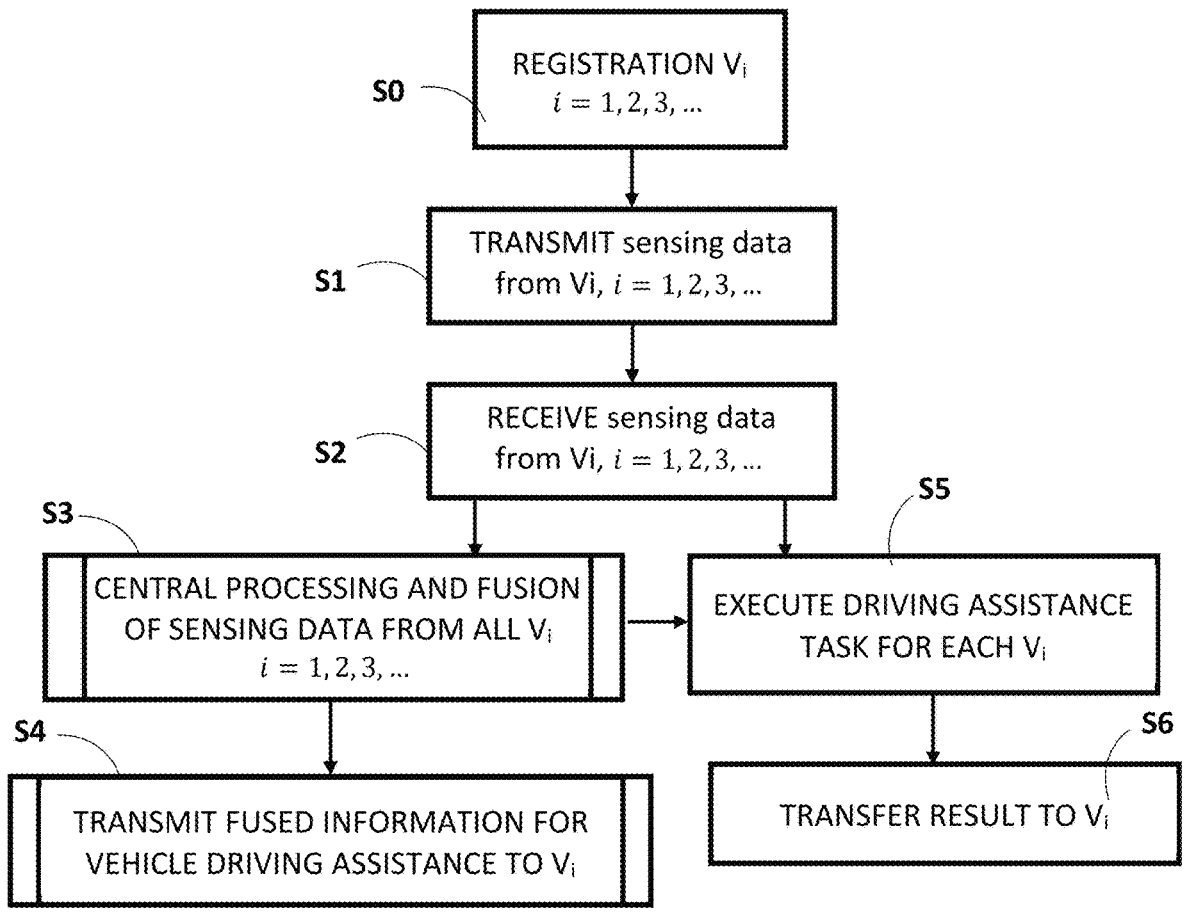
FIGS. 2A and 2B illustrate a flowchart of a computer-implemented method for vehicle driving assistance of a target vehicle within delimited area according to various embodiments.

FIG. 2A illustrates the computer-implemented method for vehicle driving assistance within the delimited area 100, according to an embodiment.

At a first point in time, referenced as to, a plurality of vehicles $V_i$ with i=1, 2, 3, . . . , are located within the delimited area 100 and connected to the wireless local area network 300. The vehicles $V_i$ can be started vehicles or stopped vehicles, for example parked vehicles or temporarily stopped vehicles.

In any case, the vehicles $V_i$ have one or more active sensors operable to capture sensing data and a radio communication module operable to transmit the sensing data captured by the sensors. In an embodiment, each of the vehicles $V_i$ may have previously registered with the central data processing system 200 through the wireless local area network 300, for example when or shortly before entering the delimited area 100. A registration step S0 may be executed by each vehicle $V_i$ entering the delimited area 100, for example upon detection and connection to the wireless local area network 300. The central data processing system 200 may store information on the registered vehicles $V_i$ with i=1, 2, 3, . . . in a database and manage the database. The vehicles $V_i$ may be deleted from the database for example when they are no longer connected to the wireless local area network 300.

The sensing data collected, or captured, by the sensors in each vehicle $V_i$ is continuously transmitted from the vehicle Vito the central data processing system 200 in real time, through the wireless local area network 300, in a step S1. The transmission of the data collected by the onboard sensors of each vehicle $V_i$ may be performed automatically, without any action from a user. The sensing data may be transferred to the central data processing system in real time, as soon as it is collected. The sensing data may be raw, unprocessed data from the sensor(s). Thus, the central data processing system 200 receives from the plurality of vehicles $V_i$ located within the delimited area 100 and connected to the wireless local area network 300, the sensing data related to the environment around each vehicle $V_i$. Each vehicle $V_i$ perceives its surrounding environment with its own onboard sensors. The output of the sensors, termed as the sensing data, may be transferred to the central data processing system 200, through the wireless local area network 300, by an onboard radio transmitter of the vehicle $V_i$. For example, the sensing data may include point clouds for radars and LiDARs, and picture frames for cameras. The sensing systems of the vehicles $V_i$, that may include cameras, radars, LiDARs, do not need to have additional means for processing the sensing data. They can be basic and low-cost sensing systems having only the functions of sensing data and transferring the data.

In a step S2, the central data processing system 200 receives the sensing data from each vehicle $V_i$ located within the delimited area 100, though the wireless network 300. The sensing data from the vehicles $V_i$ may be received in real time, as soon as it is collected.

In a step S3, the central data processing system 200 centrally processes and fuses, or aggregates, the sensing data received from the plurality of vehicles $V_i$ to determine a fused, or aggregated, environmental information of the environment within the delimited or sensing area 100. Thus, the sensor information from all the vehicles $V_i$ located within the delimited area 100 is fused or aggregated by the central processing system 200. It is as if the central processing system 200 was equipped with the onboard sensors of all the vehicles $V_i$ located in the delimited area 100. The fused or aggregated environmental information may be shared with all the vehicles $V_i$ within the delimited area 100 through the wireless network 300. In this way, each vehicle $V_i$ is virtually equipped with the sensors of all the vehicles $V_i$ located in the delimited area 100.

Figure 2B:
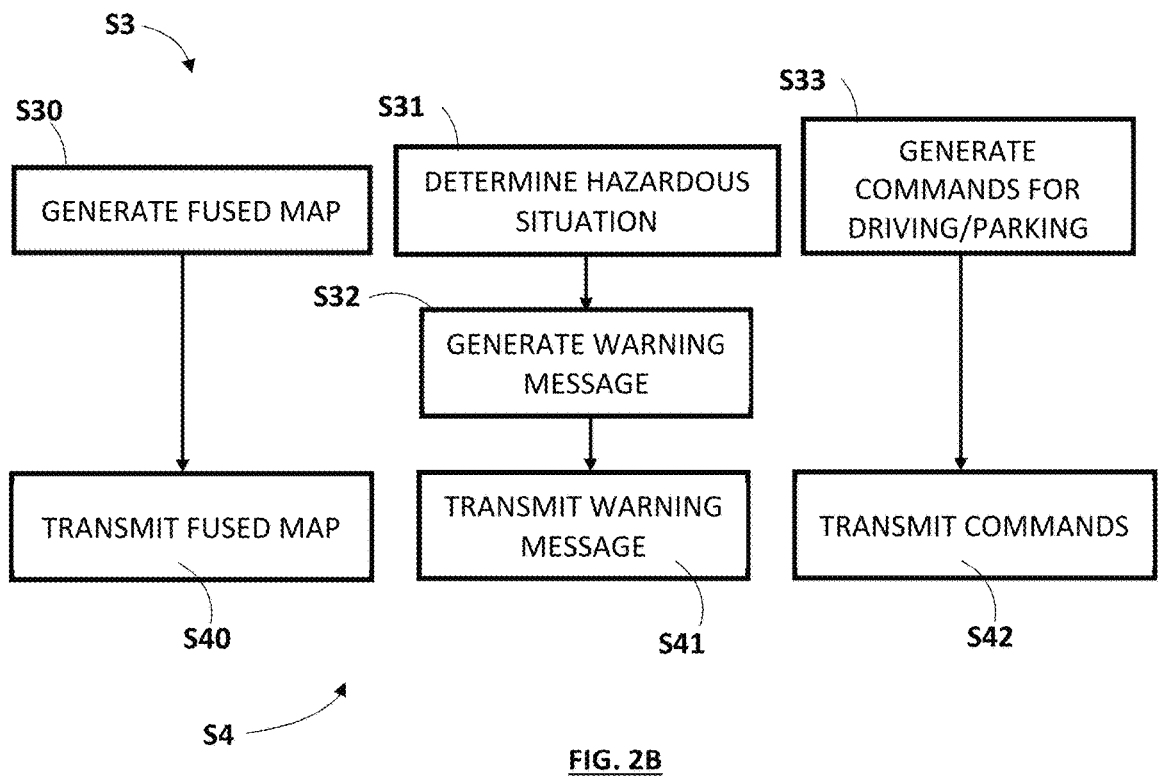

FIG. 2B illustrates the step S3, according to an embodiment.

In an embodiment, the step S3 of centrally processing and fusing, or aggregating, the sensing data from the plurality of vehicles $V_i$ may include a step S30 of generating a fused, or aggregated, map of the delimited area 100 based on the sensing data received from the plurality of vehicles $V_i$.

The central data processing system 200 may have access to a predefined map of the delimited area 100. This predefined map may be stored in a memory of the central processing system 200, and/or obtained from an online database of a service provider like OpenStreetMap® or Google Maps®. In the step S30, the central data processing system 200 may process and analyze the sensor data received from all the vehicles $V_i$ to obtain additional information related to the environment within the delimited area 100, and update the predefined map by using this additional information. The update of the predefined map may allow to add or delete objects or participants in the predefined map, and/or add information that may be useful for vehicle driving assistance in the delimited area 100. For example, one or more pedestrians, an object that has fallen to the ground, a traffic jam, a hazardous event such as a stopped vehicle or a collision, etc. may be added to the predefined map.

In a variant, in the step S30, the central processing system 200 may generate an individual map for each vehicle $V_i$, representing an area around the vehicle $V_i$, by using the sensor data from said vehicle $V_i$, and then fuse, or aggregate, the plurality of individual maps generated for the plurality of vehicles $V_i$ to generate a fused map of the delimited area 100.

In an embodiment, by processing and fusing the sensing data from the plurality of vehicles $V_i$, the central data processing system 200 may determine, or identify, a hazardous situation in the delimited area 100, in a step S31. For example, an accident has occurred in the delimited area 100, a vehicle is stopped on a road lane in a tunnel, or an object has fallen down to the ground within the delimited area 100. The hazardous situation may be identified by processing and analyzing the sensing data received from the vehicles $V_i$. For example, a stationary traffic can be detected by analyzing the speed data from the vehicles $V_i$, an object on the ground or pedestrians can be detected by image analysis of images captured by sensors of vehicles $V_i$, a collision may be detected by analyzing images captured by vehicles, etc. In that case, the central data processing system 200 generates a warning message or a warning information to inform the vehicles $V_i$ in the delimited area 100, in a step S32.

In an embodiment, in a step S33, the central data processing system 200 may generate commands to control a driving or parking function of one or more target vehicles $V_t$ in the delimited area 100, based on a result of centrally processing and fusing the sensor data of all the vehicles $V_i$. For example, the commands may control a target vehicle to adapt its speed in a tunnel, or take over the driving of a target vehicle to a chosen parking lot in a car park. In case of a warehouse comprising automated vehicles such as forklifts, the commands may control the movements of the automated vehicles in the warehouse.

In a step S4, the central data processing system 200 transmits a fused information for vehicle driving assistance, based on a result of the step S3 of centrally processing and fusing the sensing data from the vehicles $V_i$, to one or more target vehicles $V_t$ of the vehicles $V_i$ with i=1, 2, 3, . . . connected to the wireless local area network 300. The target vehicles may include one or more vehicle(s) located within the delimited area 100, and/or one or more vehicle(s) located outside the delimited area 100 but within the covering area 301 of the wireless local area network 300. For example, one or more target vehicles could be vehicles located outside the delimited area 100 and moving towards an access to the delimited area 100 to enter it.

The step S4 may include the following actions performed by the central data processing system 200:
  in a step S40, transmitting to the target vehicle(s) the fused map generated in the step S30 by using the sensing data received from the plurality of vehicles $V_i$; and/or
  in a step S41, transmitting to the target vehicle(s) the warning message related to an hazardous situation generated in the step S32; and/or
  in a step S42, transmitting to the target vehicle(s) one or more commands generated in the step S33 to control a driving of the target vehicle(s).

The central data processing system 200 continuously receives the sensing data collected by the sensors of all the vehicles $V_i$ with i=1, 2, 3, . . . located within the delimited area 100, processes and fuses the received sensing data to update the information for vehicle driving assistance transmitted to the target vehicles.

Furthermore, when a new vehicle enters the delimited area 100 and registers with the central data processing system 200, the central data processing system 200 may transmit a current information for vehicle driving assistance, for example the current fused map, and/or a current warning message, and/or commands for driving or parking, to the newly registered vehicle.

The information for vehicle driving assistance is continuously updated, in real time, based on the sensing data received over time by the central data processing system 200.

Optionally, in a step S5, the central data processing system 200 executes, for each vehicle $V_i$ with i=1, 2, 3, . . . located within the delimited area 100, one or more tasks of driving assistance or autonomous driving including self-localization of the vehicle $V_i$, mapping around the vehicle $V_i$, tracking external objects around the vehicle $V_i$, path planning for the vehicle $V_i$ and controlling the vehicle $V_i$ for example for driving and/or parking, by processing the sensing data collected by the sensors of the vehicle $V_i$ and transferred to the central data processing system 200 through the wireless network 300. The fused environmental information resulting from the step of centrally processing and fusing the sensing data from all vehicles $V_i$ may also be used by the central data processing system 200 to perform the tasks of driving assistance or autonomous driving for the considered vehicle $V_i$. The result of each task of driving assistance or autonomous driving is transferred from the central data processing system 200 to the vehicle $V_i$ through the wireless network 300, in a step S6. In this way, the processing of the sensing data collected by each vehicle $V_i$ with i=1, 2, 3, . . . located within the delimited area 100 to execute tasks of driving assistance and/or autonomous driving is deported into the central data processing system 200. The low latency of the network 300 allows to deport the processing of the sensing data collected by each vehicle $V_i$ with i=1, 2, 3, . . . located within the delimited area 100, while allowing this vehicle $V_i$ to use the result of the processing in real time, or almost in real time.

For the task of self-localization of the vehicle $V_i$, the central data processing system 200 may match a landmark information detected in the environment around said vehicle $V_i$, based on the sensing data received from said vehicle $V_i$, and a predefined map of the delimited area 100 including eh landmarks. For example, the delimited area 100 may comprise reflecting elements at predetermined positions, and the predefined map may include the reflecting elements. As a result, the central data processing system can match the landmark information obtained by processing the collected sensing data and the landmarks included in the predefined map to precisely localize the vehicle.

The central data processing system 200 includes means for carrying out the steps of the method previously described. It is configured to receive the sensing data from the vehicles $V_i$, with i=1, 2, 3, . . . , located within the delimited area 100, through the wireless local area network 300, to centrally process and fuse the received sensor data, transmit an information for vehicle driving assistance, based on a result of the processing and fusion of the received sensing data, to target vehicles.

Figure 3:
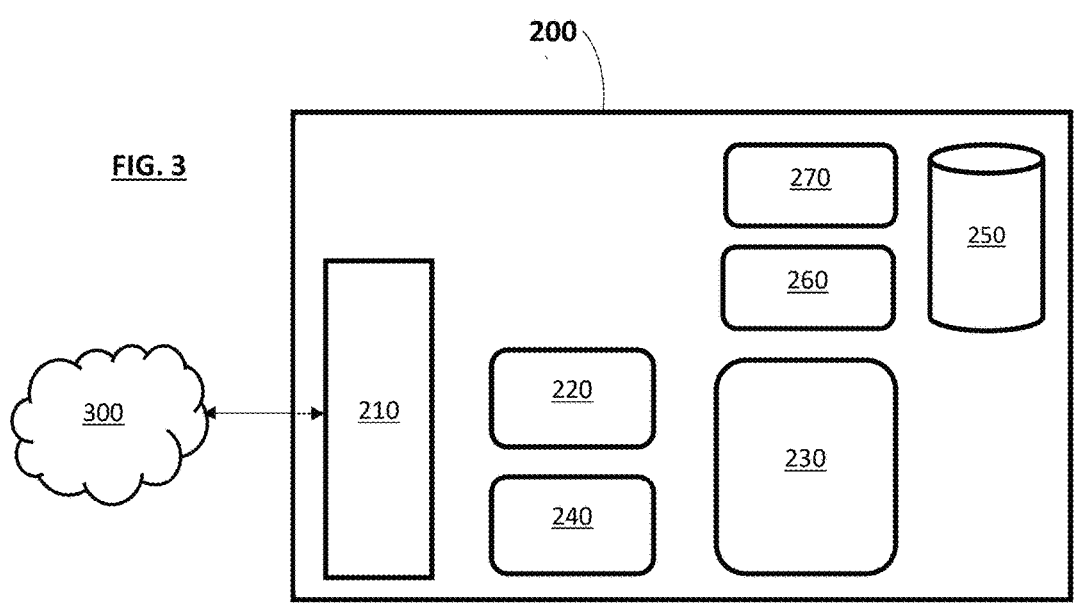
FIG. 3 illustrates a schematic block diagram of a central data processing system, according to an embodiment according to various embodiments.

In an example embodiment illustrated in FIG. 3, the central data processing system 200 may include a network interface 210 for connecting to the wireless local area network 300, a reception module 220, a data processing module 230 and a transmission module 240.

The reception module 220 is configured to receive from each vehicle $V_i$, with i=1, 2, 3, . . . , sensing data related to an environment of the vehicle $V_i$, through the network 300.

The data processing module 230 is responsible for centrally processing and fusing or aggregating the sensing data from the plurality of vehicles $V_i$, with i=1, 2, 3, . . . , and for generating a fused information for vehicle driving assistance based on a result of the processing and fusion of the sensing data. Optionally, the data processing module 230 may be configured to execute, for each vehicle $V_i$ with i=1, 2, 3, . . . located within the delimited area 100, tasks of driving assistance and/or autonomous driving such as self-localization of the vehicle $V_i$, mapping around the vehicle $V_i$, tracking external objects around the vehicle $V_i$, and controlling the vehicle $V_i$, by processing the sensing data collected by the sensors of the vehicle $V_i$.

The transmission module 240 is configured to transmit the information for vehicle driving assistance generated based on processing and fusing the sensing data from the plurality of vehicles $V_i$, with i=1, 2, 3, . . . , to target vehicles in the delimited area 100, through the wireless network 300. The transmitted information may include the fused environmental information, and/or an information generated based on the fused environment information, for example one or more commands for controlling the target vehicle $V_t$ to drive autonomously, or a warning message.

Optionally, the transmission module 240 is configured to transfer to a vehicle $V_i$ the result of one or more tasks of driving assistance and/or autonomous driving executed by processing the sensing data from said vehicle $V_i$, as previously explained.

The central data processing system 200 may further include a vehicle database 250 for storing information on the vehicles located within the delimited area, that have registered with the central data processing system 200, a registration module 260 configured to perform the task of registration of vehicles located within the delimited area 100, and a database management module 270 responsible for storage, retrieval and update of information in the database 250. The registration module 230 is responsible for registering in the database 260.

The database 260 stores information on each registered vehicle located within the delimited area 100. The central data processing system 200 may have a database management module 270 for storage, retrieval and update of information in the database 260.

Aspects include a central data processing system for vehicle driving assistance within a delimited area, including means for carrying out the steps of a method described herein. Aspects also include a system including a central data processing system for vehicle driving assistance within an delimited area covered by a wireless local area network, and a plurality of vehicles (Vi, i=1,2,3, . . . ) located within the delimited area, each vehicle having one or more sensors for collecting sensing data related to an environment around said vehicle, and a communication module for transmitting the collected sensing data to the central data processing system through the wireless local area network. Aspects further include a computer program comprising instructions which, when the program is executed by a computer, cause the computer to carry out the steps of a method described herein.

The use of "example," "advantageous," and grammatically related terms means "serving as an example, instance, or illustration," and not "preferred" or "advantageous over other examples." Items represented in the accompanying figures and terms discussed herein may be indicative of one or more items or terms, and thus reference may be made interchangeably to single or plural forms of the items and terms in this written description. The use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"), unless the context clearly dictates otherwise. Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, c-c-c, or any other ordering of a, b, and c).

What is claimed is:

1. A computer-implemented method performed by a central data processing system, for vehicle driving assistance within a sensing area, the method comprising:

receiving in real time, by a central data processor and from a plurality of vehicles located within the sensing area, through a wireless local area network covering said sensing area, sensing data captured by onboard sensors of the plurality of vehicles, wherein the sensing data from each vehicle is unprocessed sensor data and is transmitted to the central data processor without additional processing, wherein the sensing data from each vehicle is related to an environment around the vehicle, and wherein the sensing area is a GNSS-denial environment;

generating, by the central data processor, a real-time fused map of the sensing area based on the sensing data received from the plurality of vehicles based on the sensing data received from the plurality of vehicles; and transmitting, by the central data processor and to at least one target vehicle, through the wireless local area network, an information for vehicle driving assistance including the real-time fused map, wherein the central data processor is remote from the at least one target vehicle.

2. The computer-implemented method according to claim 1, wherein the fused map is generated by updating a predefined map with the sensing data received from the plurality of vehicles.

3. The computer-implemented method according to claim 1, wherein the fused map is generated by fusion of a plurality of individual maps, wherein each individual map includes an area around the vehicle that corresponds to a part of the sensing area.

4. The computer-implemented method according to claim 3, wherein each individual map is generated based on the sensing data received from the vehicle.

5. The computer-implemented method according to claim 1, further comprising:
storing, by the central data processor, vehicle information for a newly registered vehicle in a vehicle database upon registration of the newly registered vehicle with the central data processing system, through the wireless local area network;
transmitting, by the central data processor and to the newly registered vehicle, at least one of a current real-time fused map, a current warning message, and a driving or parking instruction upon the newly registered vehicle entering the sensing area; and
deleting, by the central data processor, stored vehicle information for the newly registered vehicle in the vehicle database upon detection, by the central data processor, that the newly registered vehicle is no longer connected to the wireless local area network.

6. The computer-implemented method according to claim 1, wherein transmitting the information for vehicle driving assistance further comprises:
transmitting one or more commands to control at least one of a driving function or a parking function of the at least one target vehicle.

7. The computer-implemented method according to claim 1, wherein transmitting the information for vehicle driving assistance further comprises:
transmitting a warning message related to a hazardous situation determined by the centrally processing and fusing the sensing data from the plurality of vehicles.

8. The computer-implemented method according to claim 1, wherein the central data processing system executes, for each of the plurality of vehicles, at least one of an operation including:
self-localization of the vehicle,
mapping around the vehicle,
tracking external objects around the vehicle,
path planning for the vehicle, or
controlling the vehicle, based on the sensing data from the vehicle.

9. The computer-implemented method according to claim 8, wherein the operation of self-localization of the vehicle comprises:
matching a landmark information detected in the environment around the vehicle based on the sensing data received from the vehicle, and a map of the sensing area.

10. The computer-implemented method according to claim 1, wherein the wireless local area network is a network based on at least one of a 5G communication system or a next generation communication system.

11. The computer-implemented method according to claim 1, wherein the sensing area is one of an environment including:
a tunnel,
a parking garage,
a warehouse, or
a bridge.

12. The computer-implemented method according to claim 1, wherein transmitting the information for vehicle driving assistance comprises transmitting to the at least one target vehicle located within the sensing area.

13. The computer-implemented method according to claim 1, wherein transmitting the information for vehicle driving assistance comprises transmitting to the at least one target vehicle located outside the sensing area but within a covering area of the wireless local area network.

14. A central data processing system for vehicle driving assistance within a sensing area, the central data processing system comprising:
a computer program comprising instructions which, when the program is executed by a computer, cause the computer to:
receive in real-time, by a central data processor and from a plurality of vehicles located within the sensing area, through a wireless local area network covering said sensing area, sensing data captured by onboard sensors of the plurality of vehicles, wherein the sensing data from each vehicle is unprocessed sensor data and is transmitted to the central data processor without additional processing, wherein the sensing data from each vehicle is related to an environment around the vehicle, and wherein the sensing area is a GNSS-denial environment;
generate, by the central data processor, a real-time fused map of the sensing area based on the sensing data received from the plurality of vehicles based on the sensing data received from the plurality of vehicles; and
transmit, by the central data processor and to at least one target vehicle, through the wireless local area network, an information for vehicle driving assistance including the real-time fused map, wherein the central data processor is remote from the at least one target vehicle.

15. A system comprising:
a wireless local area network;
a plurality of vehicles located within a sensing area, each vehicle comprising:
one or more sensors configured to collect sensing data related to an environment around the vehicle; and
a communication module configured to transmit the collected sensing data through the wireless local area network; and
a central data processing system for vehicle driving assistance within the sensing area covered by the wireless local area network, the central data processing system comprising:
a computer program comprising instructions which, when the program is executed by a computer, cause the computer to:
receive in real-time, by a central data processor and from the plurality of vehicles located within the sensing area, through a wireless local area network covering said sensing area, sensing data captured by onboard sensors of the plurality of vehicles, wherein the sensing data from each vehicle is unprocessed sensor data and is transmitted to the central data processor without additional processing, wherein the sensing data from each vehicle is related to an environment around the vehicle, and wherein the sensing area is a GNSS-denial environment;

generate, by the central data processor, a real-time fused map of the sensing area based on the sensing data received from the plurality of vehicles based on the sensing data received from the plurality of vehicles; and transmit, by the central data processor and to at least one target vehicle, through the wireless local area network, an information for vehicle driving assistance including the real-time fused map, wherein the central data processor is remote from the at least one target vehicle.

* * * * *